March 19, 1963
T. S. BRISKIN ETAL
3,081,669
POINTER FOR A SLIDE PROJECTOR
Original Filed March 21, 1955
2 Sheets-Sheet 1
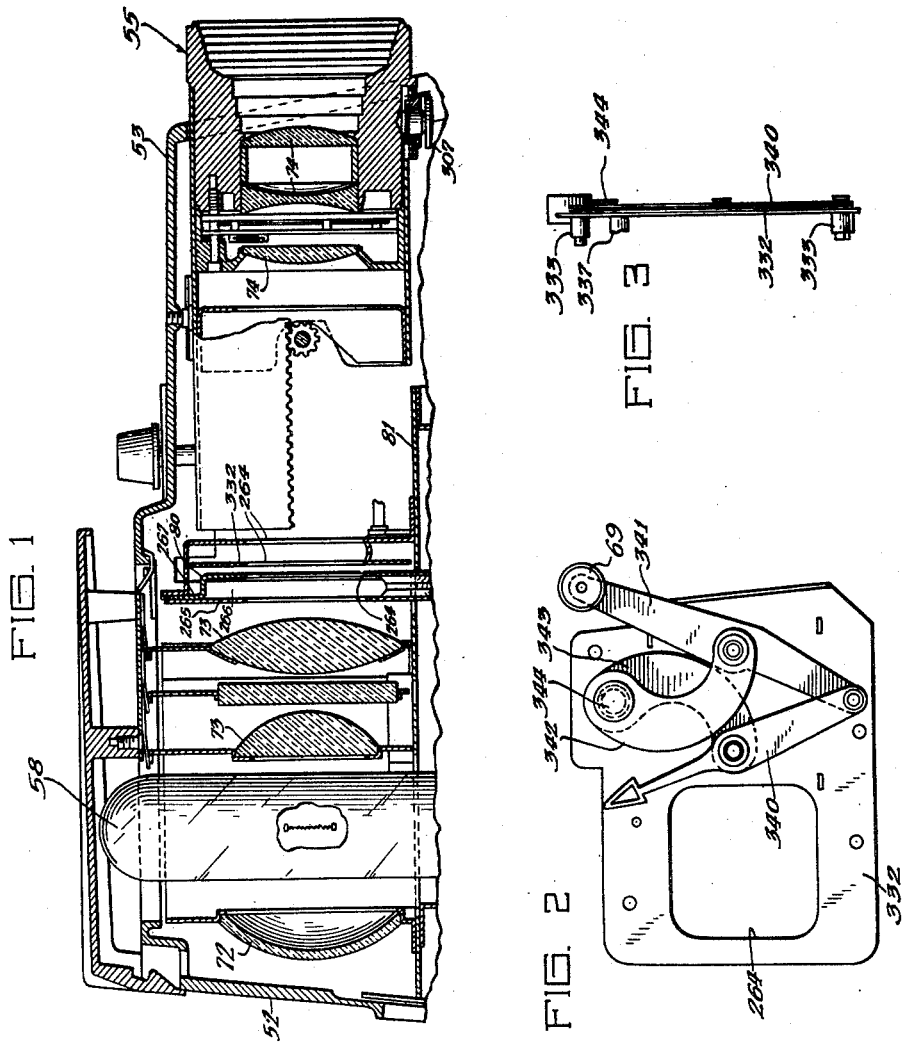
Inventors:
Theodore S. Briskin
Robert L. Moore
Rudolph A. Rowe
By: Zabel, Baker, York,
Jones & Dithmar
Attorneys March 19, 1963 T. S. BRISKIN ETAL 3,081,669
POINTER FOR A SLIDE PROJECTOR
Original Filed March 21, 1955 2 Sheets-Sheet 2
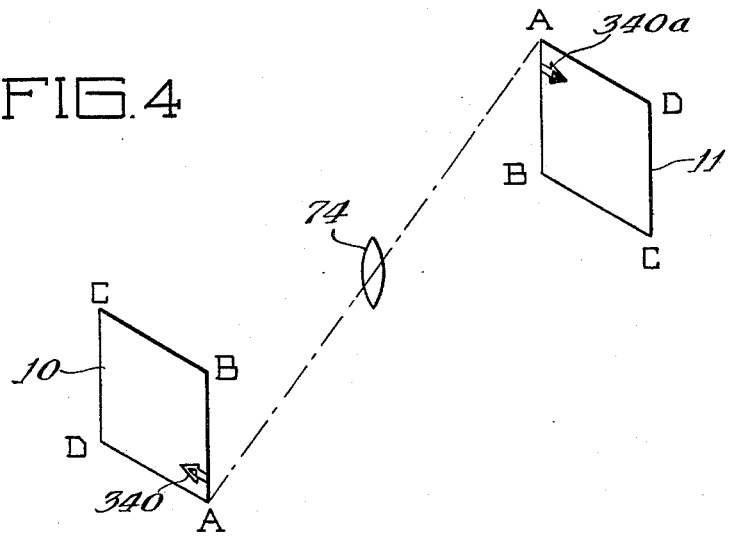
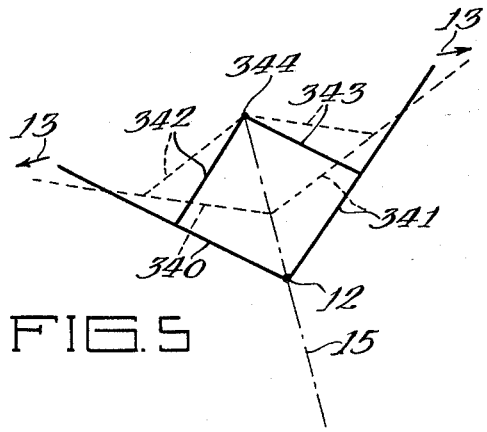
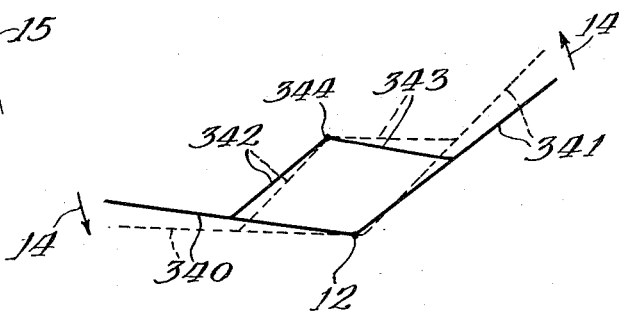
Inventors:
Theodore S. Briskin
Robert L. Moore
Rudolph A. Rom
By: Zabel, Baker, York,
Jones & Dithmar
Attorneys

United States Patent Office 3,081,669
Patented Mar. 19, 1963

3,081,669
POINTER FOR A SLIDE PROJECTOR
Theodore S. Briskin, Chicago, Robert L. Moore, La Grange Highlands, and Rudolph A. Rom, Stickney, Ill., assignors, by mesne assignments, to Revere Camera Company, a corporation of Delaware
Original application Mar. 21, 1955, Ser. No. 495,474, now Patent No. 2,968,993, dated Jan. 24, 1961. Divided and this application May 13, 1960, Ser. No. 29,056
1 Claim. (Cl. 88—24)

This invention relates to a pointer for a slide projector, and is a division of copending application, Serial No. 495,474 filed March 21, 1955, now Patent No. 2,968,993.

It is well known that the optical system of a slide projector inverts the objective both with respect to the right and left direction, looking toward the image, and also with respect to the up and down direction. Therefore, according to the present invention, improved means are provided which connect the manual actuating knob and the pointer, which connecting means serves to invert the motion transmitted with respect to two axes which are substantially perpendicular to each other.

It has previously been proposed to actuate a pointer by motion inverting mechanism, such as a pivotally mounted pantograph. However, it is difficult to construct a pantograph which is stable with respect to lateral forces, and at the same time to provide a construction which is sufficiently compact that it may be mounted right adjacent the focal plane, or slide locating means.

It is an object of our invention to provide a pointer mechanism of the type described which is in the form of a unit of minimum thickness so that it can be located immediately adjacent the slide locating means.

Another object of this invention is to provide a pantograph mechanism having an improved mode of operation. According to this aspect of our invention, the pointer and the actuating lever constitute adjacent links of a four-linkage system, and the pantograph is pivotally mounted at the point of intersection of the connecting links so that they serve as pivot links. Thus the pantograph mechanism as a whole is mounted for pivotal movement about a center which is so located that the two components of pointer motion are perpendicular to each other, in order to provide a better "feel" of operation.

With reference now to the drawings in which like reference numerals designate like parts:

FIG. 1 is a longitudinal vertical section of a portion of a slide projector embodying this invention;
FIG. 2 is a rear elevation showing the pointer;
FIG. 3 is a left end view of FIG. 2;
FIG. 4 is a diagram of an optical system illustrating the nature of the inversion; and
FIGS. 5 and 6 are diagrams illustrating the operation of the inversion mechanism shown in FIG. 2.

With reference now to FIG. 1, the slide projector includes a casing 50 in the rear end of which is mounted a suitable lamp 58, and in the front of which is slidably mounted a lens unit 55. The optical system includes a mirror 72, condenser lenses 73, and projection lenses 74 which are located in the lens unit 55.

The structure of the slide projector includes a vertical transverse plate 80 and a horizontally extending bridge member attached thereto. Suitable means 265 provide a slide receiving channel 266 just rearwardly of the vertical plate 80. Immediately in front of the vertical plate 80 is suitably mounted a plate 332. Plates 80 and 332 are provided with apertures 264 which correspond in size to the transparent portion of a slide.

Mounted on the plate 332 is a pointer which, since it is located approximately in the film plane of the automatically projected slides, will be projected on the screen, and the position of this pointer may be regulated by the operator to point to any portion of the projected picture that he desires. The pointer comprises a pantograph type of linkage comprising main links 340 and 341 pivotally connected at 12, and pivot links 342 and 343. The main link 340 constitutes the pointer, its outer end being suitably shaped, and the main link 341 comprises the manually actuated member which terminates in a pointer knob 69. The pivot links 342 and 343 are secured by a suitable pivot rivet 344 to the plate 332, and are connected at their lower ends to the main links in the manner shown in FIG. 2. Thus, the position of the pointer may be suitably regulated by manipulation of the pointer knob 69.

The inversion referred to is shown in FIG. 4 in which the objective is represented by a rectangle 10 and the image by a rectangle 11, these being positioned on opposite sides of the projecting lens 74. The corresponding corners of the rectangles 10 and 11 are lettered to illustrate inversion of the image. The pointer 340 is shown on the objective rectangle 10, and its image 340a is shown on the image rectangle 11.

In FIG. 5, the main links 340, 341 and the pivot links 342 and 343 are diagrammatically shown together with the pivot 344, and a changed position is shown in dotted lines. The arrows 13 indicate the inversion of motion as the pantograph assembly is extended. This inversion is with respect to an axis 15 connecting points 344 and 12.

The changed position of the parts which is obtained by rotating the pantograph assembly about the pivot 344 is shown in FIG. 6 in dotted lines, and the arrows 14 illustrate the inversion of motion with respect to a line which is substantially perpendicular to the axis 15.

Thus the combination of pivotal and linkage motions shown in FIGS. 5 and 6 provides a complete inversion of the motion of the pointer 340 with respect to the pointer knob 69.

Since the image on the slide is inverted, and since the pantograph arrangement shown is a motion inverting device, it will be seen that the motion imparted by the operator to the pointer knob 69 will be identical, as to direction, to the motion of the projected image of the pointer. Thus, the operator can be directly guided, in his manipulation of the knob 69, by the position of the projected pointer image on the screen without having to make mental allowance for image inversion.

The links 340 to 343, as well as the plate 332, may be made of sheet steel, thus providing an assembly of minimum thickness as shown in FIG. 3. By curving the pivot links 342 and 343 as shown in FIG. 2, stability against lateral forces is provided due to the fact that the pivot links have a very substantial overlapping surface contact when the pantograph is collapsed as shown in FIG. 2, and each pivot link has a very substantial overlapping surface contact with its associated main link when the pantograph is extended. Thus the linkage is prevented from warping out of its plane, permitting the use of parts formed of sheet steel and permitting the use of rivets for the pivotal connections. In other words, the overlapping surface contact of substantial area eliminates the need of a bearing type of construction of substantial axial length.

In a construction of this type, it is very difficult to provide riveted pivotal connections such that the frictional force resisting rotation about the pivot rivet 344 is equal to the sum of the other frictional forces which tend to resist collapsing or extension of the pantograph. Therefore, during operation, the feel of the device is such that one type of movement can be made more easily than the other. In a construction in which the two components of motion, illustrated by the arrows 13 and 14, form an angle of considerably less than 90°, the feel makes the operation very difficult. However, when the two components are substantially perpendicular to each other, the feel of the mechanism is considerably improved because it is always possible to arrive at a desired pointer location by moving the pointer knob 69 first in the direction of the more resistant component and then in the direction of the less resistant component, or vice versa.

Therefore, in the design of a pantograph fabricated from sheet metal parts secured to each other only by rivets, a greatly improved mode of operation is provided by the pantograph construction shown herein.

Although preferred embodiments of the present invention have been described herein, it will be understood that various modifications and changes may be made in the construction shown without departing from the scope of the invention as pointed out in the appended claim.

We claim:

A pointer mechanism for use in a slide projector in the form of a unti comprising a supporting plate adapted to be located at a point adjacent the projecting position of a slide, pantograph mechanism pivotally mounted on said supporting plate, said pantograph mechanism comprising a four-element linkage having a first main link serving as a pointer, a second main link pivotally connected thereto and adapted for manual actuation, and two intersecting pivot links, each being pivotally connected to a main link, and second pivot means connecting said pivot links at the point of their intersection to each other and to said supporting plate, all of said links being of substantial width so as to provide substantial overlapping surface contact between adjacent links, said pivot links being of a curved outline so as to provide an increased overlapping surface contact between said two pivot links when said pantograph mechanism is collapsed, and so as to provide increased overlapping surface contact between each pivot link and its associated main link when said pantograph mechanism is extended, thereby increasing the stability of said linkage with respect to laterally directed forces.

References Cited in the file of this patent

UNITED STATES PATENTS

| | | |
|---|---|---|
| 1,022,270 | Sciamengo | Apr. 2, 1912 |
| 1,704,811 | Stuber | Mar. 12, 1929 |